Dec. 14, 1965    C. R. WARD ETAL    3,223,502
METHOD AND APPARATUS FOR DRAWING GLASS SHEET
Filed Aug. 22, 1961    4 Sheets-Sheet 1

INVENTORS
CECIL R. WARD
FRANK J. RAU
BY
Oscar L. Spencer
ATTORNEY

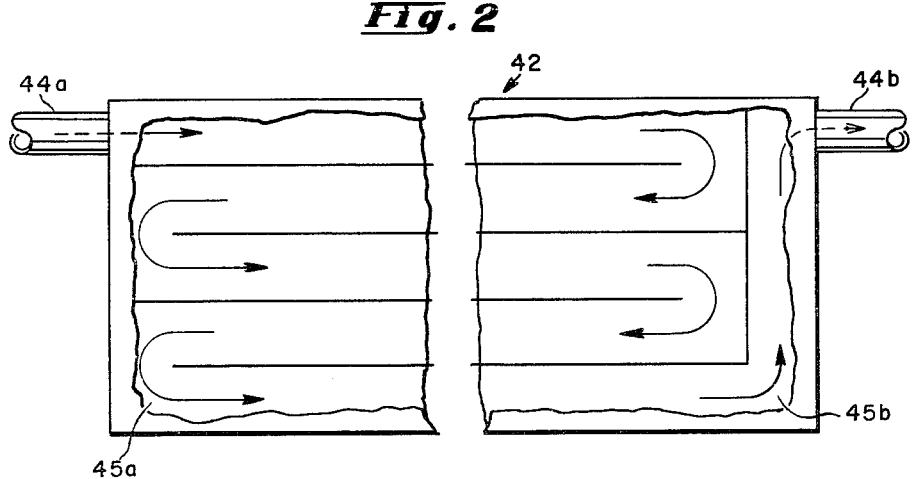
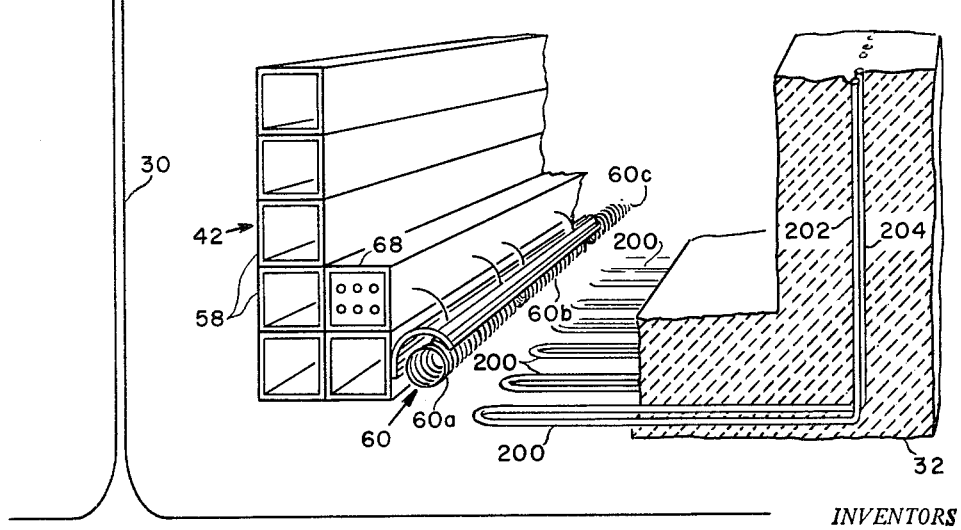
INVENTORS
CECIL R. WARD
FRANK J. RAU
BY
*Oscar L Spencer*
ATTORNEY

INVENTORS
CECIL R. WARD
FRANK J. RAU

Dec. 14, 1965  C. R. WARD ETAL  3,223,502
METHOD AND APPARATUS FOR DRAWING GLASS SHEET
Filed Aug. 22, 1961  4 Sheets-Sheet 4

INVENTORS
CECIL R. WARD
FRANK J. RAU
BY
Oscar L. Spencer
ATTORNEY

3,223,502
METHOD AND APPARATUS FOR DRAWING GLASS SHEET
Cecil R. Ward, Gibsonia, and Frank J. Rau, Pittsburgh, Pa., assignors to Pittsburgh Plate Glass Company, Pittsburgh, Pa., a corporation of Pennsylvania
Filed Aug. 22, 1961, Ser. No. 133,184
11 Claims. (Cl. 65—29)

This invention relates to the production of glass in sheet or ribbon form and, while applicable to the various processes for such production, it will be described particularly with respect to the production of sheet glass. By applying this invention to the production of sheet glass, also known as window glass, in which the glass is drawn from a bath of molten glass, it is possible to produce such glass having thickness variations which approach, if not surpass, those commonly associated with ground and polished plate glass.

In processes for drawing sheet glass, a sheet of glass is drawn vertically, as a continuous ribbon, from a bath of molten glass through a drawing chamber in which radiant heat exchangers in the form of coolers are positioned on opposite sides of the plane of draw and parallel thereto. Mechanical means, such as asbestos-covered rolls, grip the major surfaces of the sheet and draw the sheet upwardly from the bath.

Thickness variation and/or small surface irregularity is a problem considered to be inherent in sheet glass drawing processes and manifests itself in at least several general types of defects, such as wedge, long period wave variations and short period wave variations.

Wedge is a gross thickness variation in which the sheet, for example, is thicker at one edge than the other, or is thicker at the edges than at its center. Long wave variations are those which have considerable amplitude and extent and can be measured by gauging the sheet along a path in a direction transverse to the direction of the draw. Short wave variations are of small amplitude and extent and are generally superimposed on the long wave variations. Apparatus and a method for eliminating or reducing short period wave thickness variations are disclosed and claimed in the copending application of Robert A. James and Cecil R. Ward, Serial No. 771,393, filed Nov. 3, 1958, now U.S. Patent No. 3,097,942, entitled "Manufacture of Glass."

Long period wave thickness variations are generally randomly distributed, and their locations cannot be predicted with certainty.

The present invention is directed to the elimination of or substantial reduction in the general type of thickness variation identified as long wave variation and includes an automated process and apparatus for accomplishing the desired results.

Because of constructional details of the drawing apparatus, especially the coolers positioned within and across the drawing chamber to absorb radiant heat from both the sheet and portions of the bath, it can readily be understood that there is a net heat transfer pattern between the coolers and the bath across the region of the bath flowing into the sheet. It has been found that by changing this net heat transfer pattern, the long period wave thickness variations, whatever their origin, can be eliminated or substantially reduced in magnitude. Thus, in the broad aspects, this invention includes changing the net heat transfer pattern between the coolers and the bath across the region of the bath flowing into the sheet. Stated in a different manner, this invention includes establishing or setting a new heat transfer pattern between the coolers and the bath across the region of the bath flowing into the sheet.

According to the present invention, heat is differentially transferred from areas of the cooling zone through which the sheet passes as it is formed. The areas of the cooling zone from which heat is transferred differentially are opposite to those sheet areas having thicknesses which have been determined by measurements to be different from a predetermined desired thickness. In the preferred embodiment of the invention as hereinafter described, heat is introduced into areas of the cooling zone spaced from the sheet and opposite to areas of the sheet having thicknesses greater than the predetermined, desired thickness.

To accomplish the above, according to the present invention, the thickness of the ribbon is measured in a direction perpendicular to the direction of the draw, the difference between the measured thickness and a predetermined, desired thickness is determined and then radiant heat is supplied to those portions of spaces between the cooler and the bath which are in vertical alignment with the areas of positive thickness difference. For this purpose at least one segmentally operable electrically energized heating means traversing the drawing chamber in a direction substantially parallel to the surface of the bath and also to the plane of the draw is used. The heating means, constructed of a series of individual electrical heating coils connected for selective energization, is positioned above the bath and above an area thereof where glass flows into sheet formation. Controls for the heater means are positioned outside the drawing chamber so that, upon use, the drawing chamber need not be opened to the ambient atmosphere. Disturbance of operating stability because of air current entry into the chamber is thus prevented. Thus, by selective energization of electrical heater segments, the net heat transfer pattern is modified and a new pattern is established. This affects the viscosity of the glass going into the gather and the sheet and results in a selective change in glass thickness.

Preferably, the heater element is supported by the radiant heat exchanger previously referred to which obsorbs radiant energy primarily from the sheet and to a lesser degree from the glass of the bath just prior to the gather of the sheet. The heater is partially thermally and completely electrically insulated from the heat exchanger or cooler.

The present invention is compatible with a drawing chamber wherein air current control means, such as burners, suction means and the like, for influencing the normally present air currents and for producing improved quality glass are present because radiant heat transfer accomplishes its purpose and such heat transfer has no adverse effect on the existing air currents or on air current control means.

Measurements of glass thickness are periodically made either by hand or a mechanical-electrical gauging system to determine thickness of the sheet and variations from the predetermined thickness generally established by speed of draw. One such device for thickness measurements uses the property of glass to absorb X-rays. Correction of thickness variations detected are accomplished according to this invention by selectively energizing the heating means and when required, as will be further explained, by readjusting the drawing speed.

Also contemplated by this invention is an automatic control system for properly energizing the heater sections between adjacent taps in response to automatically detected and determined sheet thickness variations averaged for distances equal to and coordinated with the heater sections. The automatic control system includes, for example, a scanning mechanism energizing an electrical device which produces signals proportional to the average thickness of sections of the glass as they are being scanned. Each signal is compared with a signal proportional to the average thickness of the thinnest region of glass within the tolerances permitted for the particular thickness of the sheet being drawn. The difference in the signals determined the degree of energization of each heater section.

Because there is a certain throughput of glass for a particular thickness and speed of draw, it may be necessary to change the speed of draw to establish or adjust a base or reference thickness of glass, slowing the drawing speed if the glass is too thin or speeding it up if the overall thickness of the glass is too great. The present invention contemplates the automation of this in response to its thickness measurements when necessary.

Reference is now made to the accompanying drawings illustrating the invention in which like reference characters refer to like parts and in which:

FIG. 2 is a view of a heat exchanger and showing the flow pattern of cooling fluid therethrough, taken along line 2—2 of FIG 1;

FIG. 9 is a portion of the apparatus, as shown in FIG. 1, with a segmental cooling arrangement added.

Figure 1:
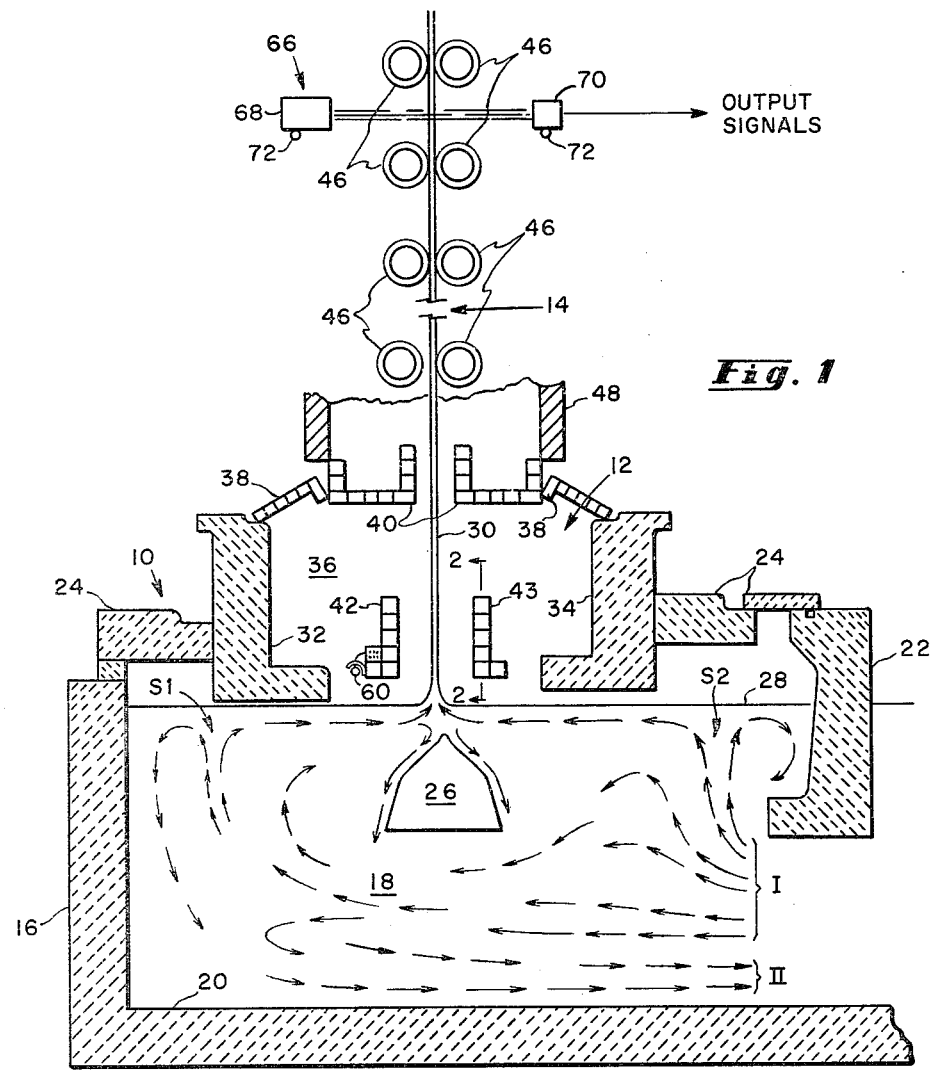
FIG. 1 is a diagrammatic sectional view of a sheet glass drawing apparatus showing the drawing bay, the general flow of glass in the bay, the drawing chamber, portions of the drawing machine and particularly illustrating portions of the invention herein disclosed.

In FIG. 1, there is illustrated a drawing bay 10, a drawing chamber 12 and a drawing machine 14. The drawing bay 10 is defined by a front wall 16, side walls 18, a floor 20, a shut-off 22 and curtain blocks 24 which act as a ceiling. All these parts are made of a suitable, hard refractory material that will adequately withstand temperatures of the order of 2100° F. to 2200° F. Glass flows into this bay under the shut-off 22 from the main body of the glass making furnace, as indicated by the arrows I. This glass is drawn up at the gather into the ribbon 30 along an area generally above the central rib of a draw bar 26 of refractory material which is submerged within the body or bath of glass 28 within the drawing bay. The draw bar 26 acts as a stabilizer for the ribbon of glass 30 being drawn upwardly from the bath 28. Near the end wall 16 and the shut-off 22, there are hot spring zones S1 and S2 at which part of the glass flowing from the main body of glass separates and flows generally downwardly and returns as to the main body of glass in the furnace, as indicated by the arrows II.

The ribbon of glass 30 is drawn through the drawing chamber 12 by the drawing machine 14. The drawing chamber 12 is defined by L-blocks 32, 34, side walls 36, door coolers 38, catch-pan coolers 40 and the surface of the bath itself. The catch-pan coolers 40 are spaced for the passage of the ribbon 30 therebetween and divide the drawing chamber 12 from the drawing machine 14 to be described. Spaced heat exchangers or coolers 42, 44 are positioned within the drawing chamber 12 above the bath, between the horizontally extending lips of the L-blocks 32, 34 and the ribbon 30 and extend substantially the width of the chamber 12. The heat exchangers or coolers 42, 43 are constructed of refractory metal conduit or pipe for the passage of a cooling fluid, such as water, therethrough, the connections for inlet and discharge of cooling fluid being positioned outside the confines of the chamber 12.

The conduit or pipe extends horizontally across the space above the molten glass bath a small distance above the surface thereof from one side of the ribbon to the other. Usually the conduits are connected as shown in FIG. 2 so that cooling water is fed into a conduit 44a at one side of the drawing chamber, flows across the drawing chamber in a direction at right angles to the other side of the chamber, then returns to the feeding side, then back to the other side, etc., where it is withdrawn from the conduit 44b. The conduits 44a and 44b provide the means by which the cooler is supported across the drawing chamber. Manifolds 45a and 45b at the ends of the conduits or pipes are such to permit the above-described flow of cooling water.

The rate of flow of cooling water generally is adjusted so that there is about a 20° F. to 50° F. differential between the temperature of the water fed to and water withdrawn from the coolers. These coolers are not only adjacent the surface of the molten pool but are disposed at a level at which attenuation of the glass takes place. The usual temperature of the feed water is about 120° F., the water withdrawn being about 140° F. The amount of heat removed by these coolers is substantial, usually being in excess of 5,000 B.t.u. per minute.

The drawing machine 14 includes a plurality of pairs of driven and driving rolls 46 supported in spaced relationship by supporting structure, generally indicated by 48. The pairs of rolls grip the ribbon 30 and exert a pulling force thereon, so as to draw the ribbon 30 from the bath 28 to a cut-off location, not shown, where the ribbon 30 is cut into discrete sheets of glass.

The parts thus described are conventional in an apparatus in accordance with the Pennvernon process, as practiced prior to the present invention.

In the description which follows, the expressions "front end" and "back or rear end" may be used to refer to locations of various parts with respect to the conventional structure illustrated in FIG. 1. The expression front end refers to that portion of the structure away from the furnace and including the end wall 16 of the bay 10. The expression back end refers to that portion of the structure near the furnace and including the shut-off 22.

Generally, the thickness variations encountered in the sheet glass drawing process are more pronounced with respect to the surface of the sheet facing the front end of the drawing apparatus than with respect to the surface of the sheet facing the back end of the apparatus, so that a remarkable improvement in flatness is achieved when applying the invention with respect to the front end of the apparatus. With this in mind, the invention will be described with respect to the front end of the apparatus. It is to be understood that the invention may be applied with respect to both front and back ends of the apparatus or solely with respect to the back end if found necessary or desirable.

In FIG. 1, it is to be noted that the front end heat exchanger or cooler 42 is somewhat different from the back end heat exchanger or cooler 43, the latter being conventional in construction. The front end heat exchanger 42 of FIG. 1 is shown in enlarged perspective in FIG. 3 and for a description of the constructional details, attention is directed to the latter figure.

Figure 3:
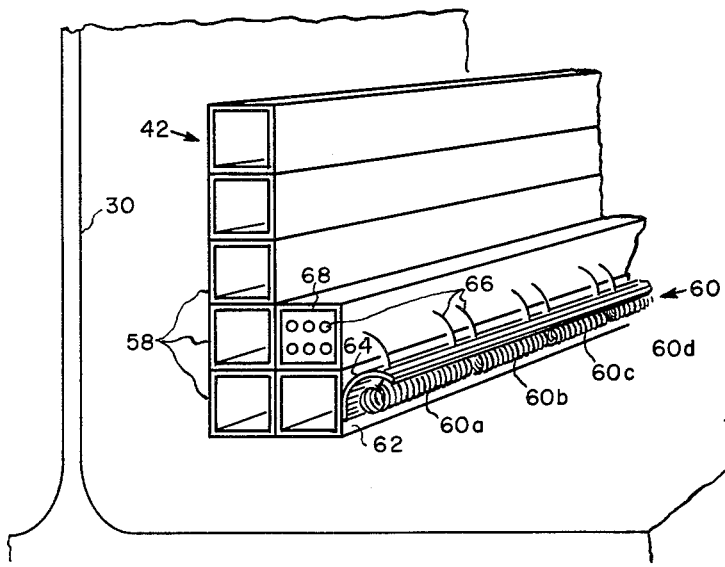
FIG. 3 is an enlarged perspective view of the heat exchanger used in FIG. 1 showing one disposition of the heater element as seen from the opposite side of the apparatus supported in relation to the glass bath and the sheet being drawn.

Looking at FIGS. 2 and 3, the heat exchanger or cooler is identified as 42 and is L-shaped in section. Like conventional heat exchangers, the heat exchanger 42 is constructed of rectangularly-sectioned metal tubing 58 assembled for the flow of a cooling fluid, such as water, therethrough, as illustrated in FIG. 2. Not shown are the heat exchanger supporting means which, as with conventionally constructed exchangers, are outwardly extending pipes serving for inlet and discharge conduits for the cooling fluid.

An electrical energized heating element 60 is positioned at the lip 62 of the heat exchanger 42 facing the lip of the L-block 32, preferably so that it does not protrude below the heat exchanger. The heating elements 60, preferably in the form of a series of individual electrical resistance coils, extend the full length of the heat exchanger 42 across the drawing chamber and are disposed close to the surface of the pool. The exact location of such coils is capable of some variation. However, they must at all events be close enough to the pool or to the zone of ribbon attenuation to provide an influence upon the thickness of the sheet. As a general rule, these coils are disposed not over 30 inches above the pool, usually below the upper reaches of the vertical coolers and more often a matter of only 2 to 6 inches above the level of the glass pool. These coils may be individually energized and are identified as 60a, 60b, 60c, etc., for selective, individual heat inputs. The heating element 60 is partially thermally and completely electrically insulated from the heat exchanger 42 by insulator or shield 64 extending thereover and attached or supported by the heat exchanger 42. The shield 64 is of a ceramic material constructed with hangers for supporting the heating element 60 in its operative position. Lead wires 66 for selectively connecting portions of the heating element 60 to a source of controllable electrical power (not shown in FIG. 3) are placed within a channel member 68 supported by the heat exchanger 42. The juxtaposition of the lead wires 66 to the heat exchanger 42 provides thermal protection for the lead wires. Thus, by energizing the various coils 60a, 60b, 60c, etc., together or in various combinations and with various amounts of current or power, the amount of heat transferred from corresponding width portions of the bath below the heating sections to the cooler 42 can be modified. Translating this into effect on thickness of a sheet, the more heat applied to one section, the thinner the corresponding area of glass will be.

To detect and determine thickness variations in the ribbon of glass being drawn, a thickness measuring device, generally identified as 66, is mounted on the drawing machine 14 at a location where the sheet 30 is set. The measuring device 66 is shown in box-diagram form in FIG. 1, and includes an X-ray generator 68 mounted adjacent one surface of the sheet of glass 30 and optically constructed to supply collimated X-rays to the glass sheet. A crystal pick-up device 70 is mounted adjacent the opposite surface of the sheet of glass 30. The generator 68 and the pick-up device 70 are optically aligned with one another and mounted, as for example, on a pair of commonly driven screw members 72 for transverse movement with respect to the ribbon 30 in unison with one another.

A suitable X-ray thickness gauge is known as a "Measuray," manufactured by The Sheffield Corporation, Dayton 1, Ohio, as described in a pamphlet entitled "Measuray, X-Ray Gages, Completely Automatic Gaging and Control Sytem for Industry," Copyright 1960, The Sheffield Corporation.

The measuring device above described utilizes the property of glass to absorb X-rays according to composition and thickness, and the pick-up emits an electrical signal proportional to the total glass thickness at any one location for the particular glass composition being drawn. If the signal is plotted against ribbon width, a trace representing the glass thickness profile is produced. Using nominal glass thickness, i.e., the thickness of the glass being drawn within specified tolerances as a base or zero line, the trace will indicate plus or minus deviations from this base. Thus, it can be readily determined which areas of the glass deviate from the desired glass thickness and can be manually adjusted accordingly. Alternatively, the signals emitted by the pick-up device may be fed into electronic equipment, as will be described, to provide automated thickness control.

Figure 4:
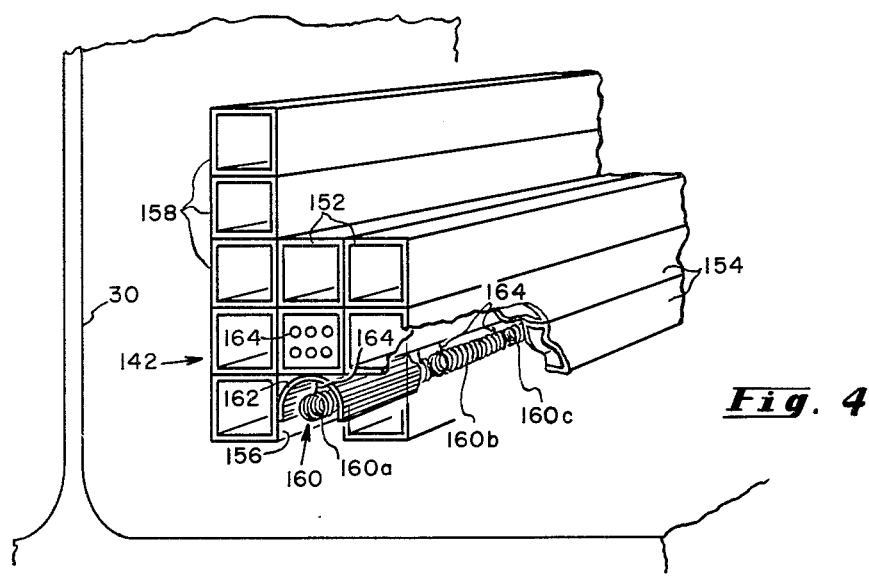
FIG. 4 is a view similar to FIG. 2 illustrating another disposition of the heater element with respect to its supporting heat exchanger.

The alternative heat exchanger or cooler identified as 142, illustrated in FIG. 4, is lower case $h$ shaped in section and has a portion 150 substantially parallel to the ribbon, a portion 152 extending away from the ribbon and a downwardly extending leg portion 154. An open-bottomed cavity 156 is thus formed by the exchanger portions. Like conventional heat exchangers, the heat exchanger 142 thus illustrated is constructed of rectangularly-sectioned metal tubing 158 assembled for the flow of a cooling fluid, such as water, therethrough and in the same manner as illustrated in FIG. 2. Not shown are the heat exchanger supporting means which are, as with conventionally constructed exchangers, outwardly extending pipes serving for inlet and discharge conduits for the cooling fluid.

An electrical energized heating element 160 is positioned within the cavity 156, preferably so that it does not protrude below the heat exchanger. The heating element 160, preferably in the form of a series of electrical resistance coils extends the full length of the heat exchanger 142 across the drawing chamber, is composed of small, individual sections, resulting in sections 160a, 160b, 160c, etc., for selective, individual energization similar to the heater element 60 of FIG. 3. The heating element 160 is partially thermally and completely electrically insulated from the heat exchanger 142 by insulator or shield 162 over the heating means 160 and within the cavity 156. The shield 162 is preferably of a ceramic material and is constructed with hangers from which the heating element 160 is suspended in its operative position. Because the heating element is positioned within the cavity 156, it is completely shielded from the sheet 30 and cannot influence the actual sheet after formation. Lead wires 164 for selectively connecting portions of the heating element 160 to a source of controllable electrical power (not shown in FIG. 4) are also placed within the cavity 156 and extend to outside the drawing chamber 12. The juxtaposition of the lead wires 164 to the heat exchanger 142 provides thermal protection for the lead wires. Thus, by energizing one or several of the various sections 160a, 160b, 160c, etc., together or with varying amounts of current, the amount of heat transferred from corresponding width portions of the bath below the heater sections to the cooler 142 can be modified as in the case of the embodiment of FIG. 3.

Figure 5:
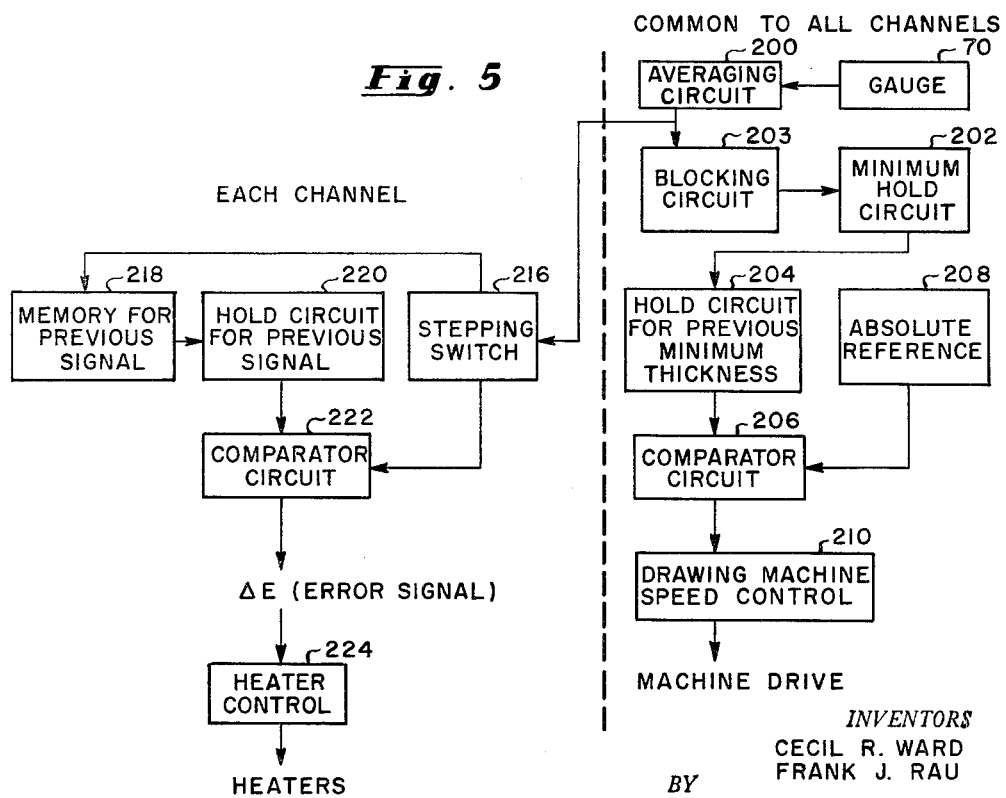
FIG. 5 is a schematic outline of an automated thickness control circuit usable with the embodiments illustrated in FIGS. 1 to 3.

Reference is now made to FIG. 5 showing a schematic block diagram of an automated control system for utilizing the signals from the pick-up 70 and for controlling the thickness of the glass being drawn not only by energization of portions of the heating elements 60 or 160 but also by modification of drawing speed.

The system includes the pick-up 70 which produces signals in response to the thickness of the glass being scanned by the thickness gauge 66 and an averaging circuit 200 for averaging the signals over a glass bath distance equal to and directly below an increment or portion, such as 60a, or 60b, of the electrical heating element 60 or 160. The minimum average signal of an incremental portion of glass wherein the electrical power applied to the heater corresponding to that increment of glass is zero is for each scan initially stored in a hold or memory circuit 202 for future reference. A blocking circuit 203 is interposed between the averaging circuit 200 and the hold or memory circuit 202 to prevent passage of those minimum signals from glass determined as being minimum but with power applied to its corresponding heater segment from the averaging circuit 200 to the minimum hold circuit 202. The minimum average signal produced by the immediately previous scan is stored in a hold or memory circuit 204 for comparison by a comparator circuit 206, with a signal proportional to an absolute reference thickness range stored in a control circuit 208, the latter being manually set depending upon the desired nominal thickness of the glass being drawn. A difference between the two signals fed into the comparator circuit 206 indicates a change is necessary in drawing speed because of a fixed throughput of glass, so that the speed of the rolls 46 is changed by a drawing machine control circuit 210. Thus, a portion of the control apparatus maintains the base reference and a constant throughput of glass and avoids an undesirable buildup of glass in the sheet resulting in glass not meeting standards of thickness. The circuit portion just described is common to the entire machine with which it is associated, as compared to the remaining circuitry which is duplicated for each channel, i.e., for each increment or portion of heater or, stated differently, for each width increment or width portion of glass below the heater corresponding to a length of heater between the taps previously referred to.

The remaining circuitry employs the averaging circuit 200 and further includes a stepping switch 216 for activating each channel as the increment of glass is scanned, a two-stage memory device 218 for the present and previous signal of the channel, a hold circuit or memory device 220 for the previous channel signal, a comparator circuit 222 for comparing the present and previous channel signals with the minimum thickness signal of the previous scan to determine any difference therebetween and a heater control 224 responsive to the difference signal between the present and previous signals of any increment or portion of glass to control the energization of the heater portion associated with the particular channel.

Figure 8:
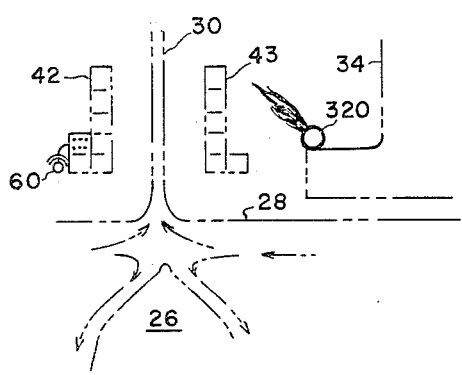
FIG. 8 is a view of a portion of the apparatus, as is shown in FIG. 1, with a typical air control burner installed on the horizontal leg of an L-block.

Referring to FIG. 8, the arrangement illustrated is the same as in FIG. 1 with the addition of air control means in the form of burners 300 resting on the horizontal legs of the L-blocks 34. Because of the nature of the gauge control heater elements 60, i.e., supplying radiant heat to the glass in the bath 28, there is no harmful influence on the air current control, so that the invention is compatible with an arrangement for producing improved, high quality sheet glass. The burners, as illustrated, are similar to and positioned like those described in the copending application of Robert A. James and Cecil R. Ward, Serial No. 771,393, filed Nov. 3, 1958, entitled "Manufacture of Glass." Of course, other air pattern control arrangements can be used and the compatibility of the present invention with other such arrangements is not changed.

In accordance with the teachings of this invention, measurements representing total thickness of the glass ribbon are periodically taken across the ribbon by means of the thickness gauge located between adjacent pairs of drawing rolls where the glass is in solid state. From these measurements, which can be graphed as a total thickness profile, it can readily be determined where deviation from a desired thickness range occurs and where corrective measures must be taken to produce a ribbon of glass substantially free from thickness variations, i.e., within a tolerated thickness range.

The variation may be represented by a positive or negative signal, i.e., the glass may be too thick or too thin. As a base or standard, it has been decided to use the thinnest increment within tolerances with no power applied to its corresponding or cooperating segment of heater element, such as 60a, 60b, or the like. If there is no such base or standard, then such a base or standard is established by (1) changing the drawing speed to correct for the thickness variation, or (2) removing power from the segment of heater above and perhaps adjacent to the thinnest section followed by a change in drawing speed if required. From the established base or standard, the heating segments requiring energization are determined. The amount of power change required to cause an incremental change in thickness is established from past experience. Thus, the actual power required in each heater section is determined and the power change applied to the respective heater sections. Changes in power requirements may be necessary as the process continues, so that periodic measurements of the ribbon thickness, either by hand or a thickness gauge, is desirable to maintain the thickness of the ribbon within established tolerances.

Figure 6:
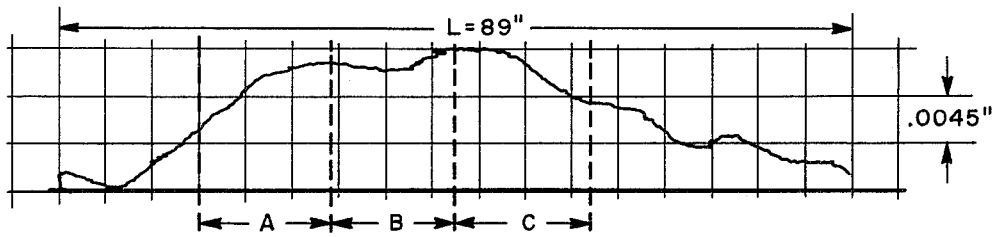
FIG. 6 is a trace of a ribbon of glass showing thickness variations transverse to the direction of draw when the invention herein disclosed is not used.

Reference is now made to FIG. 6 which is a trace across a ribbon of glass in a horizontal direction taken as by pick-up 70 feeding into a recording instrument showing a total glass thickness profile thereof. In this trace the Y-axis is signal strength (proportional to thickness) and the X-axis is the ribbon width. To be free from thickness variations (regardless of nominal thickness), the trace would be parallel to the X-axis or would coincide with the X-axis, depending upon whether the signal includes that of nominal desired thickness or a difference between that of nominal desired thickness and the actual reading of the thickness gauge. Note the deviation from and above a straight line indicating that the ribbon is too thick in certain regions.

Figure 7:
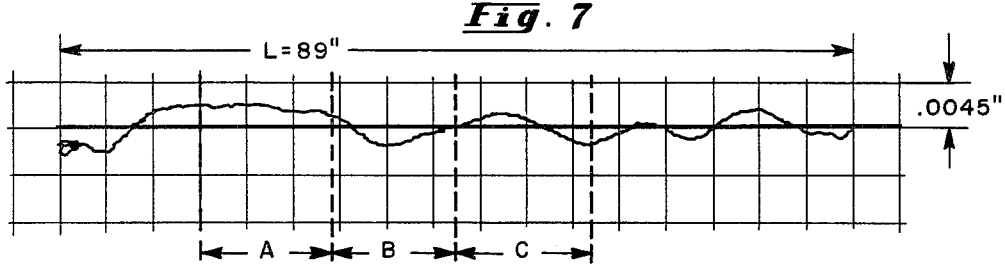
FIG. 7 is a trace of the same ribbon of glass showing thickness variations transverse to the direction of draw using the teachings of this invention.

Now refer to FIG. 7 which is a trace of the same ribbon of glass after a time delay during which electrical heater elements carried by a cooler above the bath were energized. Note that there are three sections or increments identified as A, B and C for comparison with like identified sections or increments in FIG. 6. Note that there has been a marked change in thickness and in thickness variations from side to side of the ribbon. Some parts of the ribbon after the time delay during which heat was applied are thinner than nominal thickness; however, even though this be true, they may be within tolerance.

Because of the locations of the thickness gauge 66 and the heater element 60, there is a time lapse between a power change to any heater segment and a detected glass thickness correction and, as the distance between the heater and the thickness gauge is fixed, the time delay varies with the speed of draw. It is desirable to produce a substantially uniform thickness ribbon of glass in the shortest period of time, so that it becomes desirable to scan the ribbon at intervals of time less than the time lag and to make periodic changes, when necessary, dependent upon the gauge reading, in the current applied to the heater segments.

It has been found that with heaters placed on the coolers, such as shown in FIG. 3, and the thickness gauge 66 located approximately 15 feet above the bath, the time lag between detection of a thickness variation and an effect by an energized heater segment usually is not in excess of about 30 minutes for single strength glass. By scanning the sheet for thickness variations at intervals of time less than the lag time, it is possible to adjust the power applied to the heater segments with a view of producing a uniform thickness sheet in a short period of time. Difficulty may be encountered if too much power is applied to any one heater segment at any one time, which would completely upset the total thickness profile. This difficulty can be minimized by the addition of a limiter circuit between each heater control and its heater to limit the power change that can be made at any one time.

The invention has been described using electrical heating coils supported above the glass bath by the coolers which absorb heat from the sheet and condition the glass of the bath just prior to the gather. At this location, the heaters are free from solid obstructions between the heater and the glass of the bath, which has a temperature on the order of 1800° F. to 1900° F., but are shielded by the coolers from the sheet 30. By recourse to such shielding, establishing of additional gas currents with consequent impairment of the surface of the sheet is minimized. Of course, the materials from which the heater elements are made must be capable of withstanding the temperatures to which they are subjected. However, the maximum temperatures that the heater segments themselves will reach upon energization need not be as great as the temperature of the bath directly below the heaters for the control of the thickness variations.

Other locations of the heater coils as between the coolers and the L-blocks or at the lip of the L-blocks or below the L-blocks or other place where they are disposed above the surface of that portion of the pool where the glass flows toward the gather where the ribbon is formed are within the scope of the invention so long as they are close enough to the pool surface and/or to the zone of attenuation of the glass ribbon to affect the thickness of the sheet. However, the ease and economy of control of ultimate glass quality is best achieved with the heater coils so located as illustrated here because less power is required for desired thickness. In any case, the heaters are disposed close to the surface of the pool at a place near enough so that the heat evolved can exert an effect upon the surface of the glass. Usually they are disposed only a few inches, rarely more than 30 inches and usually less than 12 inches above the pool surface.

Gas burners can be used in lieu of electric heaters to effect the control desired herein, provided such burners are constructed so that the combustion gases coming from the burners do not seriously disturb the air currents within the drawing chamber. For example, the chamber may be provided with individual heating elements which are indirectly heated by gas burners, the combustion gases being discharged from the burners without entering into the chamber. Thus, the heating adjustment to control thickness, as herein contemplated, should be effected in a manner which avoids introduction of additional gaseous components into the drawing chamber, even though other burners (300) may be resorted to in order to effect a separate control of gas currents, as described in the aforesaid application of James and Ward.

The preferred embodiment of the invention using electric heaters in segmental energizable form has heretofore been described together with a preferred mode of operation in which the drawing speed may be changed, depending upon the thickness of the glass, as when the thinnest section or area is thinner than the desired thickness and below its acceptable range. It is possible, however, to differentially remove heat at an increased rate from localized areas adjacent the cooling zone opposite to those sheet areas having undue thinness determined to be different from the predetermined thickness. This may be accomplished, for example, by providing localized coolers which are either introduced or withdrawn from the chamber in order to vary the heat exchange pattern.

In the practice of a typical embodiment of this invention, a continuous sheet or ribbon of glass is drawn from the pool of molten glass in the conventional manner with the water coolers operating as described above.

The thickness variation across the sheet is measured by moving the X-ray generator 68 and pick-up device 70 in unison in a horizontal direction transversely of the vertical direction of ribbon movement. In this way the thinner and thicker portions of the sheet are detected. When portions of the sheet are too thin, the speed of drawing the ribbon normally is reduced until the thickness of the sheet comes into the desired range.

To reduce thickness variation in which certain portions are too thick, an electric potential is imposed upon one or more of the heating elements which are opposite the thicker portion or portions of the ribbon or are above that portion of the glass pool where the glass flows to those thicker portions of the ribbon. As a general rule several heating elements which are spaced transversely of the ribbon are thus separately energized on one or both sides of the sheet.

The thickness of the sheet is remeasured from time to time, and the amounts of energy supplied to the heating coils are adjusted upwardly and/or downwardly until the thickness variation of the ribbon is materially decreased. As a rule, several (two or more) of the heaters, which are on the same side of the ribbon and spaced from each other in a direction across the ribbon, are operated at the same time so that there is simultaneous input of heat at several points across the sheet. To achieve most effective thickness control, the rates of heat input at these points are individually adjusted, the rate being generally greater at one point than at another. As a rough approximation, the rate of heat input often is greater in the area opposite the portion of the ribbon initially determined to be thickest and proportionately lower opposite areas where the thickness of the ribbon decreases. However, as the sheet reaches a greater uniformity in thickness, the heat input pattern is adjusted and correlated with the observed heat.

The amount of heat introduced by the heaters is substantially less than the amount of heat which is removed by the coolers 42 and 43. Normally, this amount is not over 10 percent and usually is less than 5 percent of the amount of heat removed by the coolers, such as vertical coolers 42 and 43. Too great input of heat can seriously impair operation of the process.

After the heaters have been adjusted and correlated with observed thickness determinations to establish a heat input pattern at which a suitable tolerance of thickness variation has been achieved, drawing of the ribbon and production of glass is continued at this heat input pattern. The thickness variation of the ribbon is monitored periodically or continuously. From time to time it will be observed that the variation begins to go out of tolerance. This is corrected by readjusting the heat input pattern, and in this respect it has been found that an input of 25 watts per inch of heater segment disposed opposite the sheet has been observed to reduce the thickness of the glass sheet opposite such segment about 0.001 inch.

By this means the variation in thickness across the ribbon is substantially reduced. Thus, this variation can be held within 0.005 inch over a continuous width equal to sixty percent or more of the ribbon.

In the illustrated embodiment, the heater elements are shown on one side of the glass sheet. However, the heater elements may, if desired, be disposed on both sides of the ribbon by replacing cooler 43 with a cooler 42.

To differentially remove heat at a localized increased rate from the areas referred to, combination segmental heating and cooling means can be employed.

Such a combination of heating and cooling means is illustrated in FIG. 9 wherein there is shown the cooler 42 and heating means 60, as in the preferred embodiment of FIGS. 1 and 3 with the addition of a plurality of generally U-shaped bayonet cooling tubes 200 extending horizontally from the bottom of the L-block 32 toward the cooler 42. Each cooling tube 200 corresponds in width to a heating element, 60a, 60b, 60c, and each is placed opposite one of the heating elements. Means to supply cooling fluid to each of the tubes 200 individually is provided, such as inlet conduits 202 and discharge conduits 204 inserted within the L-block 32. The conduits 202 are adapted for connection to suitable supply means which may be automatically controlled when used in an automatic system. The conduits 204 are, of course, connected for discharge to a sump or the like. Other equivalent means may be used for the supply of fluid to and from the cooling tubes, if so desired, without departing from the spirit of the invention. If an area is determined to have a thickness less than desired, then, without change in drawing speed, the cooling portion of the segment of the combinaion heating and cooling means located opposite the sheet area in question is energized. Other segments of the combination may be energized with electricity so as to introduce heat to their corresponding areas.

In all embodiments described, whether the heating means per se or the combination heating-cooling means is used, there is a differential transfer of heat from areas adjacent the cooling zone opposite to sheet areas having thicknesses determined to be different from the predetermined desired thickness.

As to the thickness gauging mechanism, other types of devices can be used in lieu of the X-ray equipment described.

The following description refers to an actual test performed following the teachings of this invention in the production of single strength window glass of the conventional composition which has a nominal thickness of 0.089 inch and a tolerance of —.002 inch and +.006 inch, i.e., an over-all variation of 0.008 inch. Reference is made to FIGS. 6 and 7 showing actual before and after traces of the glass made by an X-ray thickness measuring gauge as described. Each incremental unit on the Y-axis from the base line or X-axis represents 0.0045 inch of glass thickness, the glass drawn at the time of the tests being single strength glass. It can be readily seen that areas of the glass had thicknesses in excess of tolerance. Note that the traces are divided into sections, three of which are identified as A, B and C. The total glass width considered is identified as L and in this test was 89 inches (100 inches ribbon width less edge trim). This width is the total usable glass width, after trim. The total of the widths of A, B and C was 47 inches. Sections A and B were 16 inches wide, and Section C was 15 inches wide. Section A was placed approximately 18 inches inwardly of the left cut edge of the ribbon.

A heating element of Nichrome 5, 16 gauge wire wound on a mandrel with an outside diameter of ⅝ inch was installed on the front cooler in the manner illustrated in FIG. 3. The heating element was, upon removal from the mandrel, stretched to twice its length for use, and each segment of the heater element was 16 inches in length. Various incremental portions of the heater segments were separately energizable and the heater segments were designed for operation at 150 watts/inch power. The heater elements were disposed as illustrated in FIG. 2 with respect to the coolers and were about 1 inch above the surface of the pool of glass.

The trace of FIG. 6 was taken with no heat applied to any heating elements, so that it represents the actual glass thickness with its variations as usually drawn. Power was then applied to heater segments corresponding in lengths to the widths A, B, and C and opposite to those identified areas of the sheet at the input rates and over time intervals as follows:

Initial period of 25 minutes:
  Section B, 1316 watts (74.85 B.t.u./min.)
Next period for 30 minutes:
  Section A, 980 watts (55.74 B.t.u./min.)
  Section B, 1316 watts (74.85 B.t.u./min.)
  Section C, 680 watts (38.68 B.t.u./min.)
Next period of 55 minutes:
  Section A, 1160 watts (65.98 B.t.u./min.)
  Section B, 960 watts (54.60 B.t.u./min.)
  Section C, 835 watts (47.49 B.t.u./min.)

At the end of the 55-minute period, the trace of FIG. 7 was taken with the same measuring instruments using the same scale for thickness measurements. It can readily be seen that thickness variation of the glass remained within .0022 inch.

During the period of the above test, the coolers 42, 43 were removing heat from the chamber at a rate of about 8,600 B.t.u./minute, the ventilator coolers 38 were removing heat from the ribbon and the chamber at a rate of about 1,970 B.t.u./minute and the catch pan coolers 46 were removing heat from the ribbon and the chamber at a rate of about 12,600 B.t.u./minute.

As previously stated, the thickness variations encountered in the sheet glass drawing process are more pronounced with respect to the surface of the sheet facing the front end of the drawing apparatus than with respect to the surface of the sheet facing the back end of the apparatus. The results above were obtained with the heating coils installed on the front cooler, and, as illustrated by the trace of FIG. 7, a remarkable improvement in flatness was achieved. However, it is possible to apply the invention with respect to both the front and back ends of the apparatus or solely with respect to the back end if found necessary or desirable. To apply the invention to both the front and back ends of the apparatus simultaneously would require, of course, a set of the heating segments installed with respect to back cooler, duplicate control means and coordinated operation of the two heating means. To apply the invention to solely the back end of the apparatus would merely require a repositioning of the heater segments.

The invention has been described in the foregoing with reference to the drawing of sheet glass and has been particularly described and illustrated with reference to the drawing of sheet glass by the Pennvernon process or, as it is sometimes called, the Pittsburgh process. In this process, the glass is drawn vertically upwardly from a bath of molten glass in which there is a submerged clay shape known as a draw bar and through a cooled drawing chamber by a drawing machine. Cutting of the continuous ribbon of glass into large sheets occurs several floors above the drawing chamber.

The invention is applicable not only to the Pennvernon process, used as an illustrative example, but also to the Colburn and Fourcault processes for manfuacturing sheet glass and also to processes for manufacturing plate glass. In the latter, improvement in the uniformity of the thickness of the rough ribbon can be achieved, so as to reduce the time and energy required to finish the rough rolled ribbon and achieve a reduction in the cost of manufacturing ground and polished plate glass.

In the Colburn process for manufacturing sheet glass, the ribbon is drawn vertically from a pool of molten glass between coolers and is then passed over a roller, so as to withdraw the glass horizontally. In this type of operation, the heat transfer means of this invention is placed generally similarly to the placement as described with reference to the Pennvernon process.

The Fourcault process is somewhat different from both the Pennvernon and Colburn processes in that the ribbon of glass is drawn through a debiteuse partly submerged in the molten glass. The glass outside the debiteuse is stagnant and generally considered to be frozen. The sheet makes a bulb or "onion" with the debiteuse so that the lateral differential heat exchange above described can be applied to the bulb area in the Fourcault process.

The usual process for manufacturing plate glass includes forming a ribbon of glass by passing glass through spaced rolls, and subsequently grinding and polishing the surfaces of the ribbon, as a continuous body or in the form of discrete sheets, so that a polished transparent article is produced. The glass flows over a furnace lip to the rolls and then upon an apron into an annealing lehr. From the lehr the glass passes to grinding and polishing apparatus. The amount of grinding of the rough formed ribbon to produce a smooth surface can be reduced by producing a ribbon of glass of substantially uniform thickness. The inventive features can be applied by establishing differential heat exchange across the sheet in a zone of the sheet located, for example, at the apron or at the furnace lip, or between the apron and the forming rolls.

In all the processes thus described, there is a flow of molten glass toward and into a zone of withdrawal at which glass is formed to the general shape of a ribbon. During the withdrawal operation, there is movement of hot glass within the general ribbon shape and the final dimensions of the ribbon are fixed at the time the glass becomes set, i.e., when its temperature is less than its lower working temperature. As used herein, the expression "formation of the ribbon" is intended to include those portions of the processes in which molten glass flows toward and into a zone of withdrawal and/or where the glass is formed into a general shape of the ribbon until it is set to final dimensions.

We claim:

1. In the process of producing glass in ribbon form having a substantially uniform desired thickness and of reduced variation in the thickness of said ribbon, the improvement which comprises minimizing establishment of portions of the ribbon of a thickness greater than said desired thickness and portions of a thickness less than said desired thickness, by:

establishing a pool of molten glass, flowing molten glass to a ribbon forming zone in said pool, continuously withdrawing glass in ribbon form from said ribbon forming zone, measuring said glass ribbon transversely thereof to locate portions of a thickness greater than said desired thickness and portions of a thickness less than said desired thickness, increasing the heat in the region of said pool from which molten glass is supplied to the located portion of greater thickness to reduce the thickness of said portion to substantially the desired thickness, and decreasing the heat in the region of said pool from which molten glass is supplied to the located portion of less thickness than said desired thickness to increase the thickness of said last-named portion to substantially the desired thickness.

2. In the process of producing glass in ribbon form having a substantially uniform thickness and of reduced variations in the thickness of said ribbon, the improvement which comprises minimizing establishment of portions of the ribbon of a thickness greater than said desired thickness, by:

establishing a pool of molten glass, flowing molten glass to a ribbon forming zone in said pool, continuously withdrawing glass in ribbon form from said ribbon forming zone, measuring said glass ribbon transversely thereof to locate portions of a thickness greater than said desired thickness, said measurements being within a tolerance of 0.008 inch, and selectively increasing the heat in the region of said pool from which molten glass is supplied to the located portion of greater thickness to reduce the thickness of said portion with respect to the thickness of other portions to a point where thickness variation throughout the major portion of the resulting ribbon is below 0.005 inch.

3. In the process of producing glass in ribbon form having a substantially uniform thickness and of reduced variations in the thickness of said ribbon, the improvement which comprises minimizing establishment of portions of the ribbon of a thickness greater than said desired thickness, by:

establishing a pool of molten glass, flowing molten glass to a ribbon forming zone in said pool, continuously withdrawing glass in ribbon form from said ribbon forming zone, measuring said glass ribbon transversely thereof to locate a portion of a thickness greater than said desired thickness, and selectively applying heat from a source independent of the molten glass in the region of said pool from which molten glass is supplied to the located portion of greater thickness to reduce the thickness of said portion with respect to the thickness of other portions.

4. In the process as recited in claim 3, including locating spaced portions of greater thickness and selectively applying said heat to said pool from which molten glass is supplied to said located spaced portions.

5. In the process of producing glass in ribbon form having a substantially uniform thickness and of reduced variations in the thickness of said ribbon, the improvement which comprises minimizing establishment of portions of the ribbon of a thickness greater than said desired thickness, by:

establishing a pool of molten glass, flowing molten glass to a ribbon forming zone in said pool, continuously withdrawing glass in ribbon form from said ribbon forming zone, measuring said glass ribbon transversely thereof to locate portions of a thickness greater than said desired thickness, and selectively increasing the heat in the region of said pool from which molten glass is supplied to the located portion of greater thickness to reduce the thickness of said portion with respect to the thickness of other portions while shielding the ribbon from said selectively increased heat.

6. In apparatus for producing glass in ribbon form having a substantially uniform desired thickness and of reduced variation in the thickness of said ribbon, the improvement which comprises a pool of molten glass, a ribbon forming zone in said pool to which molten glass flows, means to withdraw glass in ribbon form from said ribbon forming zone, means to measure the glass ribbon tranversely thereof to locate portions of a thickness greater than said desired thickness and portions of a thickness less than said desired thickness, means to increase the heat in the region of said pool from which molten glass is supplied to the located portion of greater thickness to reduce the thickness of said portion to substantially the desired thickness, and means for decreasing the heat in the region of said pool from which molten glass is supplied to the located portion of less thickness than said desired thickness to increase the thickness of said portion to substantially the desired thickness.

7. In apparatus for producing glass in ribbon form having a substantially uniform desired thickness and of reduced variation in the thickness of said ribbon, the improvement which comprises a pool of molten glass, a ribbon forming zone in said pool to which molten glass flows, means to withdraw glass in ribbon form from said ribbon forming zone, means to measure the glass ribbon transversely thereof to locate a portion of a thickness greater than said desired thickness, and means independent of said pool to selectively increase the heat in the region of said pool from which molten glass is supplied to the located portion of greater thickness to reduce the thickness of said portion with respect to the thickness of other portions.

8. Apparatus as recited in claim 7 wherein said means to selectively increase the heat includes a plurality of heater means located above the pool and spaced from the ribbon.

9. Apparatus as recited in claim 8 wherein said heater means are electrically energized heater coils and there is included means to individually energize said coils.

10. In apparatus for producing glass in ribbon form having a substantially uniform desired thickness and of reduced variation in the thickness of said ribbon, the improvement which comprises a pool of molten glass, a ribbon forming zone in said pool to which molten glass flows, means to withdraw glass in ribbon form from said ribbon forming zone, means to measure the glass ribbon transversely thereof to locate portions of a thickness greater than said desired thickness, means shielded from said ribbon to increase the heat in the region of said pool from which molten glass is supplied to the located portion of greater thickness to reduce the thickness of said portion with respect to the thickness of other portions.

11. Apparatus as recited in claim 10, further including coolers transversely arranged with respect to said ribbon to cool said ribbon as it is withdrawn, said coolers being so constructed and arranged to support said means to increase the heat in said region of said pool.

References Cited by the Examiner
UNITED STATES PATENTS

| | | | |
|---|---|---|---|
| 1,489,876 | 4/1924 | Whittemore | 65—203 X |
| 1,680,543 | 8/1928 | Howard | 65—128 |
| 1,781,917 | 11/1930 | Drake | 65—203 X |
| 2,111,860 | 3/1938 | Kilian | 65—203 X |
| 2,150,017 | 3/1939 | Barnard | 65—29 |
| 2,428,969 | 10/1947 | Guyer. | |
| 2,780,032 | 2/1957 | Long | 65—204 |
| 3,078,695 | 2/1963 | Kozak et al. | 65—327 X |

FOREIGN PATENTS

| | | |
|---|---|---|
| 864,969 | 4/1961 | Great Britain. |

DONALL H. SYLVESTER, *Primary Examiner.*